United States Patent [19]

Mix

[11] Patent Number: 5,209,993
[45] Date of Patent: May 11, 1993

[54] METHOD OF ENVELOPING BATTERY PLATES

[75] Inventor: Renard E. Mix, Yorktown, Ind.

[73] Assignee: General Motors Corporation, Detroit, Mich.

[21] Appl. No.: 571,812

[22] Filed: Aug. 24, 1990

[51] Int. Cl.$^5$ .............................................. H01M 2/18
[52] U.S. Cl. .................................. 429/136; 29/623.2; 429/139
[58] Field of Search ................. 29/623.2; 429/136, 139

[56] References Cited

U.S. PATENT DOCUMENTS

| | | | |
|---|---|---|---|
| 3,476,612 | 11/1969 | Tench | 429/139 |
| 3,944,432 | 3/1976 | Brinkmann et al. | 429/136 |
| 4,061,843 | 12/1977 | Foulkes | 429/136 |
| 4,092,386 | 5/1978 | Rigstad | 429/139 |
| 4,396,691 | 8/1983 | Wheadon | 429/136 |
| 4,680,242 | 7/1987 | Simonton et al. | 429/136 |

Primary Examiner—William R. Dixon, Jr.
Assistant Examiner—Willie J. Thompson
Attorney, Agent, or Firm—Lawrence B. Plant

[57] ABSTRACT

Method of enveloping a battery plate in a heat-fusible fibrous separator material (e.g., fibrous glass mat) including the step of tacking the mat to itself by means of an electric arc.

6 Claims, 1 Drawing Sheet

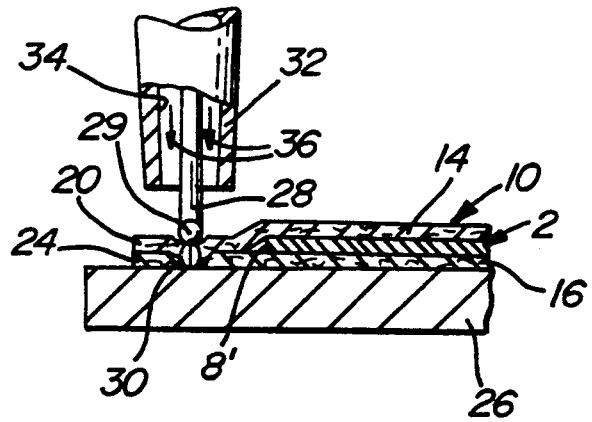

METHOD OF ENVELOPING BATTERY PLATES

This invention relates to electric storage batteries and more particularly to a method of enveloping a storage battery plate in an electrolyte retaining, fibrous, separator material.

BACKGROUND OF THE INVENTION

Electric storage batteries (e.g., lead-acid) commonly use thin sheets of microporous material (e.g., polyvinylchloride and polyethylene) known as "separators" between the individual opposite polarity plates of the battery to separate, the plates and prevent dendritic growth or treeing therebetween. Many manufacturers envelope the positive plate of the battery in the separator sheet to prevent edge treeing from one plate to the next. Such envelopes are made by folding the separator sheet in two, placing the bottom edge of the plate in the fold, and bonding overhanging lateral edges of the sheets to each other to form an envelope. Heat sealing, ultrasonic sealing, or pressure sealing techniques have been used for such bonding.

Some batteries include fibrous mats between the plates for a variety of reasons. For example, fibrous glass mats have long been used in heavy duty batteries to apply pressure to the face of the plates for achieving vibration resistance and reducing shedding of the plates. Moreover, gas-recombinant batteries include fibrous glass mats between the plates to immobilize the electrolyte while at the same time permit oxygen transport between the plates for chemical recombination at the opposite plate. Fibrous-polymer mats have also been used for similar purposes. These fibrous mats are typically stacked between the plates but heretofore have not been enveloped about the plates and secured along the lateral edges of the plates as described above for the thin microporous separators, as there has been no battery design need to so envelope the plates. From a manufacturing standpoint, however, these fibrous mats are quite flimsy and accordingly very difficult to handle using automatic equipment. Hence, it would be desirable to envelope the plate in the fibrous separator material to facilitate handling of the material in the plant and, assembly of the battery. However, it has not heretofore been possible to envelope the plate in the same manner as has been done with conventional thin sheet separators, because the techniques used to bond the edges of the thin sheet separators have not been effective to seal the fibrous mat separators and particularly fibrous glass mats.

Accordingly, it is an object of the present invention to provide a unique process for enveloping a battery plate in a fibrous separator material and bonding the edges thereof to themselves outboard the edges of the battery plate. This and other objects and advantages of the present invention will become more readily apparent from the detailed description thereof which follows.

BRIEF DESCRIPTION OF THE INVENTION

The present invention comprehends a method of enveloping a battery plate between sheets of a heat-fusible, fibrous, separator material (e.g., glass fibers), wherein the plate has a pair of opposing faces defined by a plurality of edges and sheets of the separator material are caused to overlie each of the plate's faces such that each of the sheets has at least one perimetrical portion extending outboard an edge of the plate and lying adjacent a perimetrical portion of the other of the sheets. In accordance with the present invention, the adjacent perimetrical portions of the fibrous sheet are pressed together between a set of electrodes and thereafter an electric arc struck between the electrodes to fuse the perimetrical portions together at the situs of the arc. Thereafter, the perimetrical portions are held together momentarily until the fused site cools sufficiently to bond the perimetrical portions together. In accordance with the present invention, it is not necessary that the perimetrical portion be fused together in a continuous line but rather only necessary that a few spot welds be used to tack the sheets to each other outboard the edges of the plate.

In accordance with a preferred embodiment of the present invention, the fibrous separator material will be a sheet having an area greater than twice the area of one of the plate's faces and is folded in half along one edge thereof around an edge of the plate so that a first half of the sheet overlies one face of the plate and a second half of the sheet overlies the opposite face of the plate. Each half of the sheet has a pair of opposing perimetrical portions extending outboard the edges of the plate so as to lie adjacent the outboard perimetrical portions of the other half of the sheet on the other side of the plate. Thereafter, the adjacent perimetrical portions are arc-fused and cooled in the manner described above. While the invention is particularly useful and effective for glass fibrous materials, it is also useful and effective for fibrous polymer materials so long as the arc is cool enough to preclude vaporization of the separator material.

DETAILED DESCRIPTION OF THE INVENTION

The invention will better be understood when considered in the light of the following detailed description of certain specific embodiments thereof which is given hereafter in conjunction with the several Figures in which:

FIG. 1 is a perspective view illustrating the process of enveloping a battery plate in a fibrous separator material in accordance with the present invention;

FIG. 2 is a view in the direction 2—2 of. FIG. 1;

FIGS. 3a, 3b, and 3c, are views similar to FIG. 2 but illustrating alternative embodiments of the invention.

The Figures depict a battery plate 2 having top and bottom edges 4 and 6, respectively, and lateral edges 8 and 8' enveloped in a fibrous separator 10. The fibrous separator 10 comprises a continuous sheet folded at 12 along the bottom edge 6 of the plate 2 so as to provide a first planar section 14 overlying one face of the plate 2 and a'second planar section 16 overlying the opposite face of the plate 2. Each planar section 14 and 16 has a pair of opposing perimetrical portions 18 and 20 (i.e., for planar section 14) and 22 and 24 (i.e., for planar section 16) which extend outboard the lateral edges 8, 8' of the plate 2 such that the perimetrical portion 20 of planar section 14 lies adjacent the perimetrical portion 24 of planar section 16 and the perimetrical portion 18 of planar section 14 lies adjacent the perimetrical portion 22 of planar section 16. The enveloped plate is shown laying atop a metal slab 26 which serves as the ground electrode of the system and will preferably comprise an oxidation resistant alloy such as tungston-copper. A counterelectrode 28 having a spherical tip 29 is spaced apart from the ground electrode 26 and, as best shown in FIG. 2, compresses (i.e., about 25%-50%) the perimetrical portions 20 and 24 together at the site where the electric arc 30 is struck. A sleeve 32 surrounds the electrode 28 and provides an annular passageway 34 through which an inert gas will preferably flow in the direction indicated by the arrows 36. In this regard, the inert (e.g., argon, nitrogen, helium, etc.) will prolong the useful life of the electrodes by reducing their tendency towards oxidation and, after melting has occurred will serve to accelerate cooling of the fused fibrous material.

In accordance with the present invention, it is only necessary to tack or spot weld the adjacent perimetrical portions at a few sites 38 along the length of the overlapping perimetrical portions as there is no need to provide a continuous seam though indeed such a seam be provided if so desired.

In the embodiment illustrated in FIG. 1, a single-headed electrode 28 is used to illustrate the invention. It is recognized, however, that a plurality of aligned electrodes or indeed a plurality of electrodes on the periphery of a rotating wheel may also be used to provide the tack welds 38 as the enveloped plate 2 progresses along the production line. In the case where the electrodes extend radially from the periphery of a wheel, it may be necessary to index the enveloped plate, in stop-and-go fashion, to provide a momentary cooling period after cessation of the arc to insure sufficient solidification of the melted fibrous material for bonding of the adjacent perimetrical portions together.

FIGS. 3a-3c represent three variations of the embodiments shown in FIGS. 1 and 2 and in addition thereto include a collar 40 positioned in the tip 42 of the sleeve 32 for compressing the adjacent perimetrical portions 20 and 24 together between the electrodes. FIG. 3a also shows a welding electrode 44 having a pointed tip 46, whereas FIGS. 3b and 3c show a hemispherical tip 48 and flat electrode tip 50, respectively.

Commercially available heli-arc, TIG, or plasma-arc equipment, as well as other types of arc-welding equipment may readily be modified to practice the process of the present invention.

EXAMPLE

A fibrous glass mat having a thickness of about 1.7 mm and specific weight of about 240 g/m$^2$ was folded around the bottom edge of a battery plate as described above so as to provide adjacent perimetrical portions of the mat along each lateral edge of the plate. The perimetrical portions were positioned atop a copper plate that was electrically connected to the ground of a Miller Welding Co. model Dial Arc H-F heli-arc welder having a 3/32" diameter welding electrode with a spherical tip. The electrode pressed the two layers of glass mat together so as to compress them about 30% of their combined thickness at the dimple created by the electrode. The machine was set with straight polarity (i.e., from welding electrode to ground), 10-45 AG, 10-55 DC, and 15-20 percent power. An arc was struck for about one tenth (1/10) of a second while argon flowed at a rate of about 20 cfm (at 30 psi) through the sleeve surrounding the electrode. The heat of the arc produced sufficient heat to melt the fibers in both layers. The electrode was then held in place for approximately one-half (½) second following fusion to insure solidification of the glass and bonding of the adjacent glass mat layers together.

While the invention has been disclosed primarily in terms of one specific embodiment thereof it is not intended to be limited thereto but rather only to the extent set hereafter in the claims which follows.

The embodiments of the invention in which an exclusive property or privilege is claimed are defined as follows:

1. A method of enveloping a battery plate in a heat-fusible, fibrous separator material, said plate having a pair of opposing faces defined by a plurality of edges, said method comprising the steps of:
   a. overlying each said face of a said plate with a sheet of said separator material such that each said sheet has at least one perimetrical portion extending outboard a said edge of said plate and lies adjacent the perimetrical portion of the other of said sheets;
   b. pressing said adjacent perimetrical portions together between a set of electrodes;
   c. striking an electric arc between said electrodes sufficient to fuse said perimetrical portions together at the situs of said arc; and
   d. holding said perimetrical portions together until said fused perimetrical portions cool sufficiently to bond said perimetrical portions together.

2. A method of enveloping a battery plate in a heat-fusible, fibrous separator material, said plate having a pair of opposing faces defined by a first pair of opposing edges and a second pair of opposing edges substantially perpendicular to said first pair of edges said method comprising the steps of
   a. folding a sheet of said separator material around one of the edges of said first pair of edges, said sheet having first and second planar sections each overlying a said face and having a pair of opposing perimetrical portions extending outboard said second pair of edges such that a perimetrical portion of one of said sections lies adjacent a perimetrical portion of said second section;
   b. pressing said adjacent perimetrical portions together between a set of electrodes;
   c. striking an electric arc between said electrodes sufficient to fuse said perimetrical portions together at the situs of said arc; and
   d. holding said perimetrical portions together until said fused perimetrical portions cool sufficiently to bond said perimetrical portions together.

3. A method according to claim 1 wherein said pressing is effected by said electrodes.

4. A method according to claim 1 wherein said separator material comprises glass fibers.

5. A method according to claim 1 wherein said separator material comprises polymeric fibers.

6. A method according to claim 1 wherein a plurality of said arcs are struck along the length of said adjacent perimetrical portions.

* * * * *